United States Patent [19]

Scherr et al.

[11] Patent Number: 5,641,855

[45] Date of Patent: Jun. 24, 1997

[54] WATER-SOLUBLE CONDENSATION PRODUCTS OF AMINO-CONTAINING COMPOUNDS AND CROSSLINKERS, PREPARATION THEREOF AND USE THEREOF

[75] Inventors: Guenter Scherr, Ludwigshafen; Wolfgang Reuther, Heidelberg; Dietmar Moench, Weinheim; Friedrich Linhart, Heidelberg; Juergen Weiser, Schriesheim, all of Germany

[73] Assignee: BASF Aktiengesellschaft, Ludwigshafen, Germany

[21] Appl. No.: 464,623

[22] PCT Filed: Dec. 16, 1993

[86] PCT No.: PCT/EP93/03573

§ 371 Date: Jun. 26, 1995

§ 102(e) Date: Jun. 26, 1995

[87] PCT Pub. No.: WO94/14873

PCT Pub. Date: Jul. 7, 1994

[30] Foreign Application Priority Data

Dec. 24, 1992 [DE] Germany .................... 42 44 194.3

[51] Int. Cl.$^6$ .................................................. C08G 69/00
[52] U.S. Cl. .................. 528/310; 528/229; 528/314; 528/315; 528/322; 528/329.1; 528/335; 528/339.3; 528/342; 524/800
[58] Field of Search .................... 528/310, 332, 528/328, 229, 314, 342, 315, 339.3, 322, 329.1, 330; 524/800

[56] References Cited

U.S. PATENT DOCUMENTS 4,066,494  1/1978  Scharf et al. .

FOREIGN PATENT DOCUMENTS 2916356  4/1979  Germany .

Primary Examiner—Jeffrey C. Mullis
Assistant Examiner—P. Hampton-Hightower
Attorney, Agent, or Firm—Oblon, Spivak, McClelland, Maier & Neustadt, P.C.

[57] ABSTRACT

There are described water-soluble condensation products of amino-containing compounds and crosslinkers, obtainable by reacting (a) polyalkylenepolyamines, polyamidoamines, ethyleneimine-grafted polyamidoamines, polyetheramines and mixtures thereof, with (b) monethylenically unsaturated carboxylic acids, salts, esters, amides or nitriles of monoethylenically unsaturated carboxylic acids, chlorocarboxylic acids and/or glycidyl compounds such as glycidic acid, glycidamide or glycidyl esters, and (c) at least bifunctional crosslinkers having a halo-hydrin, glycidyl, aziridine or isocyanate unit or a halogen atom as functional group, to form water-soluble condensation products having a viscosity of at least 100 mPas in a 20% strength by weight aqueous solution at 20° C., processes for preparing the water-soluble condensation products by reacting the above-mentioned compounds of groups (a), (b) and (c), and the use of the condensation products as drainage, flocculation and retention aids in papermaking.

23 Claims, No Drawings

WATER-SOLUBLE CONDENSATION PRODUCTS OF AMINO-CONTAINING COMPOUNDS AND CROSSLINKERS, PREPARATION THEREOF AND USE THEREOF

The present invention relates to water-soluble condensation products of amino-containing compounds and at least bifunctional crosslinkers, to processes for preparing them by reacting amino-containing compounds with monoethylenically unsaturated carboxylic acids and derivatives thereof and at least bifunctional cross-linkers to form water-soluble condensation products, and to the use of the condensation products as drainage, flocculation and retention aids in papermaking.

U.S. Pat. No. 4,144,123 discloses a process for preparing nitrogen-containing condensation products by grafting polyamidoamines with ethyleneimine and reacting the products thus obtainable with α,ω-bis(chlorohydrin) ethers of polyalkylene oxides at from 20° to 100° C. to form high molecular weight, still just water-soluble resins which— measured at 20° C. in a 20% strength by weight aqueous solution—have a viscosity of more than 300 mPas. The condensation products thus obtainable are used as retention, flocculation and drainage aids in papermaking.

U.S. Pat. No. 4,066,494 discloses the use of nitrogen-containing condensation products based on polyalkylenepolyamines as drainage accelerants and retention aids in the paper industry. The nitrogen-containing condensation products are prepared by reacting polyalkylenepolyamines comprising from 15 to 500 alkyleneimine units with α,ω-chlorohydrin ethers of polyethylene oxides comprising from 18 to 90 ethylene oxide units at from 20° to 100° C. to form high molecular weight, still water-soluble resins.

DE-C-2 916 356 discloses a process for preparing water-soluble polyetheramines by condensing di- or higher amines having from 2 to 10 nitrogen atoms with chloro-hydrin ethers formed from 1 mol of dihydric alcohol having from 2 to 5 carbon atoms, ethoxylation products thereof containing up to 18 ethylene oxide units, glycerol or polyglycerol containing up to 15 glycerol units and at least 2-8 mol of epichlorohydrin in polar, water miscible solvents in the absence or substantial absence of water at from 110° to 200° C. and then adding an alkali metal or alkaline earth metal base in such an amount to neutralize at least 20% of the hydrogen chloride formed in the course of the condensation. This is followed by a postcondensation. The condensation products are used as flocculation, retention and drainage aids in papermaking.

Of the above-described condensation products, in particular the substances disclosed in U.S. Pat. No. 4,144,123 have proved useful as retention and drainage aids in the art of papermaking. However, all the condensation products mentioned above are ineffective in papermaking from an acid pH in the presence of relatively large amounts of alum.

It is an object of the present invention to provide novel compounds. It is a further object to provide a papermaking aid which is more effective in the acid pH range than the known compounds.

We have found that these objects are achieved by water-soluble condensation products of amino-containing compounds and at least bifunctional crosslinkers, obtainable by reacting (a) polyalkylenepolyamines, polyamidoamines, ethylene-imine-grafted polyamidoamines, polyetheramines and mixtures thereof, with (b) monoethylenically unsaturated carboxylic acids, salts, esters, amides or nitriles of monoethylenically unsaturated carboxylic acids, chlorocarboxylic acids and/or glycidyl compounds of the formula

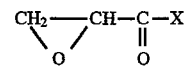 (I)

where
X is —NH$_2$, —OMe or —OR,
Me is H, Na, K or ammonium, and
R is C$_1$-C$_4$-alkyl or C$_2$-C$_4$-hydroxyalkyl, and (c) at least bifunctional crosslinkers having a halohydrin, glycidyl, aziridine or isocyanate unit or a halogen atom as functional group, to form water-soluble condensation products having a viscosity of at least 100 mPas in a 20% strength by weight aqueous solution at 20° C.

We have also found a process for preparing water-soluble condensation products of the above-described kind by reacting the compounds (a) with the compounds (b) and then reacting the products with the compounds (c) to form water-soluble condensation products which have a viscosity of at least 100 mPas in a 20% strength by weight aqueous solution at 20° C., or by reacting the compounds (a), (b) and (c) all together. The above-described condensation products are used as drainage, flocculation and retention aids in papermaking.

Component (a) can be a polyalkylenepolyamine. A polyalkylenepolyamine is for the purposes of the present invention a compound which contains at least 3 nitrogen atoms, for example diethylenetriamine, triethylenetetraamine, tetraethylenepentamine, pentaethylenehexamine, diaminopropylethylenediamine, trisaminopropylamtne or a polyethyleneimine. The polyethyleneimine preferably has an average molecular weight ($M_w$) of at least 300. The average molecular weight of the polyethyleneimine can be up to 1000000. Of particular commercial interest is the use of a polyethyleneimine having an average molecular weight of from 1200 to 25000.

Further suitable compounds of group (a) are polyamidoamines. They are obtained for example on reacting dicarboxylic acids having from 4 to 10 carbon atoms with polyalkylenepolyamines, which preferably contain from 3 to 10 basic nitrogen atoms in the molecule. Suitable dicarboxylic acids are for example succinic acid, maleic acid, adipic acid, glutaric acid, suberic acid, sebacic acid and terephthalic acid. It is also possible to use mixtures of carboxylic acids, for example a mixture of adipic acid and glutaric acid or a mixture of maleic acid and adipic acid. The preferred dicarboxylic acid for preparing the polyamidoamines is adipic acid. Suitable polyalkylenepolyamines for condensation with the dicarboxylic acids were mentioned earlier, e.g. diethylenetriamine, triethylenetetramine, dipropylenetriamine, tripropylenetetramine, dihexamethylenetriamine, aminopropylethylenediamine and bisaminopropylethylenediamine. The polyalkylenepolyamines can also be used in the form of mixtures in the preparation of the polyamidoamines. The polyamidoamines are preferably prepared in the absence of the solvent, but can also be prepared, if desired, in inert solvents. The condensation of the dicarboxylic acids with the polyalkylenepolyamines is carried out at elevated temperatures, for example within the range from 120° to 220° C. The water of reaction is distilled out of the reaction mixture. The condensation may also be carried out in the presence lactones or lactams of carboxylic acids having from 4 to 8 carbon atoms. Per mole of dicarboxylic acid it is customary to use 0.8 to 1.4 mol of polyalkylenepolyamine. The polyamidoamines thus obtainable have primary and secondary NH groups and are soluble in water.

Component (a) can also be an ethyleneimine-grafted polyamidoamine. A product of this kind is preparable by the action of ethyleneimine on the above-described polyamidoamines in the presence of acids or Lewis acids, e.g. sulfuric acid, phosphoric acid or boron trifluoride etherate. Under the conditions described the ethyleneimine becomes grafted on to the polyamidoamine. For example, per basic nitrogen group in the polyamidoamine it is possible to graft on from 1 to 10 ethyleneimine units; that is, about 10–500 parts by weight of ethyleneimine are used per 100 parts by weight of a polyamidoamine.

Further suitable compounds of group (a) are polyetheramines. Compounds of this kind are known for example from the previously cited reference DE-C-2 916 356. As mentioned therein, polyetheramines are obtained by condensing di- or higher amines with chlorohydrin ethers at elevated temperatures. The polyamines can contain up to 10 nitrogen atoms. The chlorohydrin ethers are prepared for example by reacting dihydric alcohols having from 2 to 5 carbon atoms, the alkoxylation products thereof with up to 60 alkylene oxide units, glycerol or polyglycerol containing up to 15 glycerol units, erythritol or pentaerythritol with epichlorohydrin. The amount of epichlorohydrin used per mole of one of the alcohols mentioned is at least 2–8 mol. The reaction of the di- or higher amines with the chlorohydrin ethers is customarily carried out at from 10° to 200° C.

Polyetherpolyamines are also obtained by condensing diethanolamine or triethanolamine in a conventional manner; cf. U.S. Pat. No. 4,404,362, U.S. Pat. No. 4,459,220 and U.S. Pat. No. 4,407,895.

The above-described polyalkylenepolyamines can be partially amidated. Products of this kind are prepared for example by reacting polyalkylenepolyamines with carboxylic acids, carboxylic esters, carboxylic anhydrides or carbonyl halides. Having regard to the subsequent reactions, the polyalkylenepolyamines are preferably amidated to 1–30%, usually only up to 20%. This is because the amidated polyalkylenepolyamines have to have free NH groups left in order that they may be reacted with the compounds (b) and (c). The polyalkylene-polyamines can be amidated using for example carboxylic acids having from 1 to 28 carbon atoms. Suitable carboxylic acids are for example formic acid, acetic acid, propionic acid, benzoic acid, lauric acid, palmitic acid, stearic acid, oleic acid, linoleic acid and behenic acid. Amidation is also possible for example by reacting the polyalkylenepolyamines with alkyldiketenes.

The polyalkylenepolyamines can also be used as a compound of group (a) in a partially quaternized form. Suitable quaternizing agents are for example alkyl halides, such as methyl chloride, ethyl chloride, butyl chloride, epichlorohydrin, hexyl chloride, dimethyl sulfate, diethyl sulfate and benzyl chloride. If quaternized polyalkylene polyamines are used as the compound of group (a), the degree of quaternization is preferably from 1 to 30%, usually only up to 20%, in order that a sufficient number of free NH groups should be available for the subsequent reactions.

Of the compounds of group (a), polyethyleneimines having an average molecular weight of from 1200 to 25000, polyamidoamines which have been grafted with ethyleneimine, and not more than 20% amidated polyethyleneimines are preferred.

Suitable monoethylenically unsaturated carboxylic acids for use as component (b) have for example from 3 to 18 carbon atoms in the molecule. Suitable compounds of this kind are for example acrylic acid, methacrylic acid, dimethacrylic acid, ethylacrylic acid, allylacetic acid, vinylacetic acid, maleic acid, fumaric acid, itaconic acid, methylenemalonic acid, citraconic acid, oleic acid and linolenic acid. Of this group of acids, acrylic acid, methacrylic acid and maleic acid are preferred. The salts of the monoethylenically unsaturated carboxylic acids which are likewise suitable for use as compounds of group (b) are derived from the alkali metal, alkaline earth metal and ammonium salts of the acids mentioned. In particular the sodium, potassium and ammonium salts are of industrial importance. The ammonium salts can be derived not only from ammonia but also from amines or amine derivatives such as ethanolamine, diethanolamine and triethanolamine. Of the alkaline earth metal salts, in particular the magnesium and calcium salts of the monoethylenically unsaturated carboxylic acids come into consideration.

The esters of the monoethylenically unsaturated carboxylic acids are derived for example from monohydric alcohols having from 1 to 20 or dihydric alcohols having from 2 to 6 carbon atoms, e.g. methyl acrylate, ethyl acrylate, n-propyl acrylate, isopropyl acrylate, n-butyl acrylate, isobutyl acrylate, methyl methacrylate, ethyl methacrylate, isopropyl methacrylate, n-butyl methacrylate, 2-ethylhexyl acrylate, 2-ethylhexyl methacrylate, palmityl acrylate, lauryl acrylate, diaryl acrylate, lauryl methacrylate, palmityl methacrylate, stearyl methacrylate, dimethyl maleate, ethyl maleate, isopropyl maleate, 2-hydroxyethyl acrylate, 2-hydroxyethyl methacrylate, 2-hydroxypropyl acrylate, 3-hydroxypropylacrylate, 2-hydroxypropyl methacrylate, 3-hydroxypropyl methacrylate, hydroxybutyl acrylate, hydroxybutyl methacrylate and hydroxyhexyl acrylate and methacrylate.

Suitable amides of monoethylenically unsaturated carboxylic acids are for example acrylamide, methacrylamide and oleamide. Of the nitriles of monoethylenically unsaturated carboxylic acids, in particular acrylonitrile and methacrylonitrile came into consideration.

Suitable chlorocarboxylic acids of group (b) are for example chloroacetic acid, 2-chloropropionic acid, 2-chlorobutyric acid, dichloroacetic acid and 2,2'-dichloropropionic acid.

Suitable compounds of group (b) also include glycidyl compounds which can be characterized with the aid of the formula

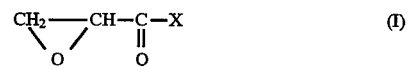

where

X is —NH$_2$, —OMe or —OR,

Me is H, Na, K or ammonium, and

R is C$_1$-C$_4$-alkyl or C$_2$-C$_4$-hydroxyalkyl.

Specific compounds of the formula I are for example glycidic acid, its sodium, potassium, ammonium, magnesium or calcium salts, glycidamide and glycidic esters such as methyl glycidate, ethyl glycidate, n-propyl glycidate, n-butyl glycidate, isobutyl glycidate, 2-ethylhexyl glycidate, 2-hydroxypropyl glycidate and 4-hydroxybutyl glycidate. Of the compounds of the formula I, glycidic acid, its sodium, potassium and ammonium salts and glycidamide are preferred.

Preferred compounds of (b) are acrylic acid, methacrylic acid and maleic acid and mixtures of acrylic acid and maleic acid or methacrylic acid and maleic acid, in each case in any desired proportion.

The compounds of group (c) are at least bifunctional crosslinkers having a halohydrin, glycidyl, aziridine or isocyanate unit or a halogen atom as functional group. Suitable crosslinkers are for example epihalohydrins, in particular epichlorohydrin, and α,ω-bis(chlorohydrin) polyalkylene glycol ethers and the α,ω-bis(epoxides) obtained therefrom by treatment with bases. The chlorohydrin ethers are prepared for example by reacting polyalkylene glycols with epichlorohydrin in a molar ratio of from 1:2 to 1:5. Suitable polyalkylene glycols are for example polyethylene glycol, polypropylene glycol and polybutylene glycols and block copolymers of $C_2$-$C_4$-alkylene oxides. The average molecular weights ($M_w$) of the polyalkylene glycols range for example from 200 to 6000 and are preferably within the range from 300 to 2000 g/mol. α,ω-Bis(chlorohydrin) polyalkylene glycol ethers of this kind are described for example in the background art reference U.S. Pat. No. 4,144,123. As is likewise mentioned therein, treating the dichloro-hydrin ethers with bases gives the corresponding bis-glycidyl ethers.

Other suitable crosslinkers are α,ω-dichloropoly-alkylene glycols, which are known for use as crosslinkers for example from EP-B-0 025 515. They are obtainable by reacting dihydric, trihydric or tetrahydric alcohols, preferably alkoxylated dihydric, trihydric or tetrahydric ones, either 1. with thionyl chloride with the elimination of HCl and then subjecting the chlorosulfonated compounds to catalytic decomposition with the elimination of sulfur dioxide, or 2. with phosgene with the elimination of HCl to form the corresponding bischlorocarbonic esters and then subjecting these esters to catalytic decomposition with the elimination of carbon dioxide to obtain α,ω-dichloroethers.

The preferred alcohol component is an ethoxylated or propoxylated glycol, which is reacted with from 1 to 100, in particular from 4 to 40, mol of ethylene oxide per mole of glycol.

Other suitable crosslinkers are α,ω- or vicinal dichloroalkanes, for example 1,2-dichloroethane, 1,2-dichloropropane, 1,3-dichloropropane, 1,4-dichlorobutane and 1,6-dichlorohexane. Examples of further crosslinkers are obtainable by reacting at least trihydric alcohols with epichlorohydrin in such a way that the reaction products contain at least two chlorohydrin units; the polyhydric alcohols used are for example glycerol, ethoxylated or propoxylated glycerols, polyglycerols having from 2 to 15 glycerol units in the molecule and optionally ethoxylated and/or propoxylated polyglycerols. Crosslinkers of this kind are known for example from the above-cited reference DE-C-2 916 356. It is also possible to use crosslinkers which contain blocked isocyanate groups, for example trimethyl-hexamethylene diisocyanate blocked with 2,2,3,6-tetramethyl-4-piperidinone. Crosslinkers of this type are known, for example from DE-A-4 028 285, as are aziridine-containing crosslinkers based on polyethers or substituted hydrocarbons, eg. 1,6-bis-N-aziridinohexane, cf. U.S. Pat. No. 3,977,923. It is of course also possible to use mixtures of two or more crosslinkers to increase the molecular weight.

The water-soluble condensation products are obtainable by reacting the compounds of group (a) with the compounds of groups (b) and (c). This reaction can be carried out by first reacting the compounds of groups (a) and (b) and only then adding compounds of group (c). However, the compounds (a), (b) and (c) can also be reacted all together. Both the two-stage and the single-stage procedures are in general to be carried out at elevated temperatures in order that the reactions may take place sufficiently rapidly, for example within the temperature range from 10° to 200° C., preferably from 30° to 90° C. The products are water-soluble condensates which have a viscosity of at least 100 mPas in a 20% strength by weight aqueous solution at 20° C. The viscosity of the condensation products of the invention can be up to 100 Pas and is preferably within the range from 200 to 2000 mPas (measured on a 20% strength by weight aqueous solution at 20° C.).

The components (a), (b) and (c) can be used in any desired ratio. However, to obtain ready-to-use water-soluble condensation products, the compounds (a) and (b) are used in such a ratio that from 20 to 99%, preferably from 30 to 85%, of the primary and secondary amino groups of (a) survive unchanged into the reaction product of (a) and (b). The compounds of (c) are preferably used in a ratio from 1:0.001 to 1:10, in particular from 1:0.05 to 1:2, based on compound (a).

The process for preparing the water-soluble condensation products comprises in one embodiment of reacting the compounds of group (a) with the compounds of group (b) and then reacting the products with the compounds (c) to form water-soluble condensation products which have a viscosity of at least 100 mPas in a 20% strength by weight aqueous solution at 20° C. However, the compounds (a), (b) and (c) can also be reacted all together. Those compounds of group (b) which contain a monoethylenically unsaturated double bond react in both versions of the process with the compounds of group (a) in the manner of Michael addition, while chlorocarboxylic acids and the abovementioned glycidyl compounds of the formula I react with the primary or secondary amino groups of the compounds of group (a) via the chloro group or via the epoxy group.

The above-described water-soluble condensation products are used as drainage, flocculation and retention aids in papermaking. For this purpose they are added to the paper stock in an amount of from 0.01 to 2, preferably from 0.02 to 1, % by weight, each percentage being based on the solids. The condensation products of the invention have the advantage over the known condensation products of similar construction, for example those obtainable by condensing (a) and (c), that they are very effective in papermaking from an acid pH even in the presence of relatively high quantities of alum, for example 3% by weight of alum or higher.

The condensation products of the invention can be used for making all grades of paper, paperboard and cardboard, for example paper for newsprint (letter press/offset printing), medium-fine writing and printing paper, imitation intaglio printing paper and also light-weight coating base paper. These grades of paper are produced in the main from ground wood, thermomechanical pulp (TMP), chemothermomechanical pulp (CTMP), pressure ground wood (PGW) or sulfite or sulfate pulp, which may each be short- or long-fibered. Other suitable raw materials for making the pulp include cellulose and woodpulp which in integrated factories is processed from a more or less moist state directly without prior thickening or drying into paper and, because not all the impurities have been removed, still contains from the digestion stage substances which strongly interfere with the usual papermaking process. The process of the invention makes it possible to prepare not only filler-free but also filler-containing papers. The filler content of the paper can be up to a maximum of 30% by weight and is preferably within the range from 5 to 25% by weight. Suitable fillers are for example clay, kaolin, chalk, talc, titanium dioxide, calcium sulfate, barium sulfate, aluminum oxide, stain white or mixtures thereof. If filler-containing papers are produced, an aqueous slurry of fiber stock and filler is prepared first.

The percentages in the Examples are by weight. The viscosities were measured on a 20% strength by weight aqueous solution in a Brookfield viscometer at 20° C., unless otherwise stated.

EXAMPLE 1

The method described in U.S. Pat. No. 4,144,123 is followed to condense adipic acid with a mixture of ethylenepropylenetriamine and ethylenedipropylenetetramine to form a polyamidoamine which is then grafted with ethyleneimine. The graft product contains 3 ethyleneimine units per basic nitrogen group of the polyamidoamine.

A 2 l flask equipped with a stirrer and a device for working under a nitrogen atmosphere is charged with 990 g of a 37.5% strength aqueous solution of the above-described polyamidoamine graft product, followed by 53 g of acrylic acid. The reaction mixture is stirred and held at 80° C. with stirring for 3 hours. Then 451 g of the addition product of the ethyleneimine-grafted polyamido-amine with acrylic acid are removed from the flask, mixed with 300 g of water and introduced in the form of an aqueous solution of the addition product into a 1 l flask, heated to 70° C., and admixed with 82.7 ml of a 21.7% strength aqueous solution of the $\alpha,\omega$-bischloro-hydrin ether of a polyethylene oxide of molecular weight 400, and the reaction mixture is further stirred at 70° C. for 3 hours, in the course of which it undergoes crosslinking until it has a viscosity of 830 mPas (measured on samples at 20° C. and at a concentration of 20% by weight).

EXAMPLE 2

A 4 l flask equipped with a stirrer, a reflux condenser and a device for working under a nitrogen atmosphere is charged with 1098 g of polyethyleneimine having an average molecular weight ($M_w$) of 20 000, followed by 921 g of water as diluent. 263 g of acrylic acid are then added and the reaction mixture is heated at 80° C. for 3 hours.

351.8 g of the above-described Michael addition product of polyethyleneimine with acrylic acid are introduced into flask equipped with a stirrer, a reflux condenser and a device for working under nitrogen, diluted with 448 g of water and heated to 70° C. Immediately thereafter 29.3 ml of a 21.7% strength aqueous solution of the bischlorohydrin ether of a polyalkylene glycol of average molecular weight 400 are added in the course of 120 minutes and the reaction mixture is further stirred at 70° C. for 3 hours. Samples are taken from the reaction mixture to monitor the course of the reaction. As soon as the reaction mixture has a viscosity of 1700 mPas (determined at 20° C. on a 20% by weight aqueous solution), the reaction mixture is cooled down to room temperature and it can be used directly as a retention and drainage aid in papermaking.

EXAMPLE 3

Example 2 is repeated to react 762 g of a 48.2% strength aqueous solution of polyethyleneimine having an average molecular weight of 2000 g per mole with 205 g of acrylic acid at 80° C. and then add 914 g of a 21.7% strength aqueous solution of the bischlorohydrin ether of polyalkylene glycol of average molecular weight 400. The result is an aqueous solution having a solids content of 22.7% and a viscosity of 570 mPas (determined at 20° C. on a 20% strength aqueous solution).

EXAMPLE 4

Example 2 is repeated to react 871 g of a 48.2% strength aqueous solution of polyethyleneimine having an average molecular weight of 2000 g per mole with 120 g of acrylic acid at 80° C. and then crosslink the Michael addition product of polyethyleneimine and acrylic acid by adding 1034 g of a 21.7% strength aqueous solution of the bischlorohydrin ether of a polyalkylene glycol of average molecular weight 1500 g per mole. The result is a 23.7% strength aqueous solution of condensation product which has a viscosity of 970 mPas in a 20% strength aqueous solution at 20° C.

EXAMPLE 5

433 g of the Michael addition product of polyethyleneimine with acrylic acid described in Example 2 are diluted with 725 g of water and crosslinked with 115 ml of a 21.6% strength aqueous solution of $\alpha,\omega$-bis-chlorohydrin ether of a polyethylene glycol of average molecular weight of 400 at 70° C. to such an extent that the viscosity of the reaction mixture, measured at 20° C. on a 20% strength by weight aqueous solution, is 1000 mPas. To prevent further crosslinking of the condensation product, 0.5 ml of a 50% strength aqueous solution of hydroxylammonium sulfate and 2 ml of a 50% strength aqueous solution of sodium bisulfite are added. The pH of the condensation product is then adjusted to 8.

EXAMPLE 6

The method described in Example 2 is followed to prepare a Michael addition product from acrylic acid and polyethyleneimine of average molecular weight 2000 in a weight ratio of 1:7. 351 g of the addition product and 448 g of water are then crosslinked with 331.7 ml of a 21% strength aqueous solution of bischlorohydrin ether of a polyethylene glycol of average molecular weight of 400. The condensation reaction is carried on until a 20% strength aqueous solution of the condensation product has a viscosity of 640 mPas at 20° C.

Condensation product A

The products of the invention are compared with a commercial condensation product obtainable as described in Example 3 of U.S. Pat. No. 4,144,123. The comparative product is an ethyleneimine-grafted polyamidoamine formed from adipic acid and ethylenetriamine, which has been crosslinked with polyethylene glycol dichlorohydrin ether.

Application tests

Determination of drainage time: 1 l of the in-test paper stock suspension is drained in a Schopper-Riegler tester. The time determined for various efflux volumes is used as the criterion for the rate of drainage of the particular in-test stock suspension. The drainage times were determined after a passage of 700 ml of water.

Optical transmissivity of wire liquor

It is determined with the aid of a photometer and serves as a measure for the retention of fines and fillers. It is reported in percent. The higher the optical transmissivity, the better the retention.

EXAMPLES 7 TO 14 AND COMPARATIVE EXAMPLES 1 TO 4

67 parts of TMP stock and 23 parts of unprinted newsprint paper were used to prepare a pulp having a consistency of 2 g per liter. The pH of the pulp was adjusted with sulfuric acid to 4.8. This pulp was divided into several portions, which were admixed with the amounts of alum indicated in the table. All the samples had a pH of 4.8, corrected with sulfuric acid or sodium hydroxide solution. The samples were then admixed as indicated in the table with the condensation products prepared in the examples or with the condensation product A and the drainage time and optical transmissivity of the wire liquor were determined. The results obtained are indicated in the table. The condensation products were in all cases added in an amount of 0.02%, based on pulp solids.

TABLE

| | | | Drainage time [sec] | | | | | |
|---|---|---|---|---|---|---|---|---|
| | | Addition to paper stock Condensation product obtained as per example | Alum content [%] | | | | | |
| Ex. | Comp. Ex. | | 0 | 2 | 4 | 6 | 8 | 10 |
| 7 | — | 3 | 62 | 61 | 81 | 79 | 46 | 47 |
| 8 | — | 4 | 59 | 61 | 82 | 83 | 49 | 49 |
| 9 | — | 5 | 59 | 64 | 82 | 87 | 47 | 47 |
| 10 | — | 6 | 60 | 62 | 83 | 80 | 53 | 48 |
| — | 1 | Condensation product A | 54 | 61 | 91 | 98 | 57 | 63 |
| — | 2 | — | 117 | 98 | 115 | 138 | 69 | 75 |

| | | | Optical transmissivity of wire liquor [%] | | | | | |
|---|---|---|---|---|---|---|---|---|
| | | Addition to paper stock Condensation product obtained as per example | Alum content [%] | | | | | |
| Ex. | Comp. Ex. | | 0 | 2 | 4 | 6 | 8 | 10 |
| 11 | — | Polymer 3 | 58 | 57 | 62 | 64 | 60 | 58 |
| 12 | — | Polymer 4 | 60 | 57 | 61 | 61 | 60 | 58 |
| 13 | — | Polymer 5 | 59 | 57 | 62 | 59 | 58 | 58 |
| 14 | — | Polymer 6 | 57 | 56 | 60 | 61 | 57 | 56 |
| — | 3 | Condensation product A | 62 | 56 | 53 | 51 | 48 | 50 |
| — | 4 | — | 31 | 37 | 44 | 39 | 42 | 40 |

We claim:

1. Water-soluble condensation products of amino-containing compounds and at least bifunctional crosslinkers, obtainable by reacting (a) polyalkylenepolyamines, polyamidoamines, ethyleneimine-grafted polyamidoamines, polyetheramines and mixtures thereof, with (b) monoethylenically unsaturated carboxylic acids, salts, esters, amides or nitriles of monoethylenically unsaturated carboxylic acids, chlorocarboxylic acids and/or glycidyl compounds of the formula $$CH_2 \underset{O}{\overset{}{\diagdown \diagup}} CH - \underset{O}{\overset{\|}{C}} - X \qquad (I)$$

where
X is —$NH_2$, —OMe or —OR,
Me is H, Na, K or ammonium, and
R is $C_1$-$C_4$-alkyl or $C_2$-$C_4$-hydroxyalkyl, and (c) at least bifunctional crosslinkers having a halo-hydrin, glyctdyl, aziridine or isocyanate unit or a halogen atom as functional group, to form water-soluble condensation products having a viscosity of at least 100 mPas in a 20% strength by weight aqueous solution at 20° C.

2. Water-soluble condensation products as claimed in claim 1, wherefor the compounds (a) and (b) are reacted in such a ratio that from 20 to 99% of the primary and secondary amino groups of (a) survive unchanged into the reaction product of (a) and (b) and the compounds (c) are used in a weight ratio of (a):(c) of from 1:0,001 to 1:10.

3. A process for preparing the water-soluble condensation products of claim 1, which comprises reacting the compounds (a) with the compounds (b) and then reacting the products with the compounds (c) to form water-soluble condensation products which have a viscosity of at least 100 mPas in a 20% strength by weight aqueous solution at 20° C.

4. A possess as claimed in claim 3, wherein the compounds (a), (b) and (c) are reacted all together.

5. In a process for preparing paper, paperboard or cardboard from a paper pulp, the improvement comprising adding to said paper pulp the condensation products of claim 1.

6. Water-soluble condensation products as claimed in claim 1, wherein component (a) is a polyalkylenepolyamine which contains at least 3 nitrogen atoms and has an average molecular weight of at least 300.

7. Water-soluble condensation products as claimed in claim 6, wherein component (a) is diethylenetriamine, triethylenetetraamine, tetraethylenepentamine, pentaethylenehexamine, diaminopropylethylenediamine, trisaminopropylamine or a polyethyleneimine.

8. Water-soluble condensation products as claimed in claim 6, wherein component (a) is a polyethyleneimine having a molecular weight of from 1200 to 25000.

9. Water-soluble condensation products as claimed in claim 1, wherein component (a) is a polyamidoamine obtained by reacting a dicarboxylic acid having 4 to 10 carbon atoms with a polyalkylenepolyamine having 3 to 10 basic nitrogen atoms.

10. Water-soluble condensation products as claimed in claim 9, wherein said dicarboxylic acid is succinic acid, maleic acid, adipic acid, glutaric acid, suberic acid, sebacic acid, terephthalic acid or a mixture thereof.

11. Water-soluble condensation products as claimed in claim 9, wherein said polyalkylenepolyamine is diethylenetriamine, triethylenetetraamine, tetraethylenepentamine, pentaethylenehexamine, diaminopropylethylenediamine, trisaminopropylamine or a polyethyleneimine.

12. Water-soluble condensation products as claimed in claim 9, wherein 0.8 to 1.4 mol polyalkylenepolyamine is reacted with 1 mol dicarboxylic acid.

13. Water-soluble condensation products as claimed in claim 1, wherein component (a) is an ethyleneimine-grafted polyamidoamine comprising 1 to 10 ethyleneimine per basic nitrogen group in the polyamidoamine.

14. Water-soluble condensation products as claimed in claim 1, wherein said monoethylenically unsaturated carboxylic acid of component (b) has from 3 to 18 carbon atoms.

15. Water-soluble condensation products as claimed in claim 14, wherein said monoethylenically unsaturated carboxylic acid of component (b) is acrylic acid, methacrylic acid, dimethacrylic acid, ethylacrylic acid, allylacetic acid, vinylacetic acid, maleic acid, fumaric acid, itaconic acid, methylenemalonic acid, citraconic acid, oleic acid or linolenic acid.

16. Water-soluble condensation products as claimed in claim 14, wherein component (b) is acrylic acid, methacrylic acid, maleic acid, a mixture of acrylic acid and maleic acid, or a mixture of methacrylic acid and maleic acid.

17. Water-soluble condensation products as claimed in claim 1, wherein component (b) is a salt, ester, amide or nitrile of a monoethylenically unsaturated carboxylic acid.

18. Water-soluble condensation products as claimed in claim 17, wherein the salt component of said salt of a monoethylenically unsaturated carboxylic acid is an alkali metal, an alkaline earth metal or an ammonium salt.

19. Water-soluble condensation products as claimed in claim 17, wherein the salt component of said salt of a monoethylenically unsaturated carboxylic acid is sodium, potassium, ammonium, ethanolamine, diethanolamine, triethanolamine, magnesium or calcium.

20. Water-soluble condensation products as claimed in claim 17, wherein said ester of a monoethylenically unsaturated carboxylic acid is methyl acrylate, ethyl acrylate, n-propyl acrylate isopropyl acrylate, n-butyl acrylate, isobutyl acrylate, methyl methacrylate, ethyl methacrylate, isopropyl methacrylate, n-butyl methacrylate, 2-ethylhexyl acrylate, 2-ethylhexyl methacrylate, palmityl acrylate, lauryl acrylate, diaryl acrylate, lauryl methacrylate, palmityl methacrylate, stearyl methacrylate, dimethyl maleate, ethyl maleate, isopropyl maleate, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, hydroxybutyl acrylate, hydroxybutyl methacrylate, hydroxyhexyl acrylate or hydroxyhexyl methacrylate.

21. Water-soluble condensation products as claimed in claim 17, wherein said amide of a monoethylenically unsaturated carboxylic acid is acrylamide, methacrylamide or oleamide.

22. Water-soluble condensation products as claimed in claim 17, wherein said nitrile of a monoethylenically unsaturated carboxylic acid is acrylonitrile or methacrylonitrile.

23. Water-soluble condensation products as claimed in claim 1, wherein component (c) is a epihalohydrin, $\alpha,\omega$-bis (chlorohydrin)polyalkylene glycol ethers, $\alpha,\omega$-bis(epoxide) polyalkylene glycol ethers, $\alpha,\omega$-dichloropolyalkylene glycol, $\alpha,\omega$-dichloroalkane or vicinal dichloroalkane.

* * * * *